United States Patent [19]

Murata et al.

[11] Patent Number: 4,814,311

[45] Date of Patent: Mar. 21, 1989

[54] METHOD FOR PRODUCTION OF CATALYST COMPONENT FOR OLEFIN POLYMERIZATION (P-1292)

[75] Inventors: Masahide Murata; Masafumi Imai; Hiroyuki Furuhashi; Kouji Maruyama; Hiroshi Ueno, all of Saitama, Japan

[73] Assignee: Toa Nenryo Kogyo Kabushiki Kaisha, Tokyo, Japan

[21] Appl. No.: 132,735

[22] Filed: Dec. 14, 1987

[30] Foreign Application Priority Data

Dec. 26, 1986 [JP] Japan ................... 61-308535

[51] Int. Cl.$^4$ ............................................. C08F 4/64
[52] U.S. Cl. ................................ 502/111; 502/115; 502/116; 502/121; 502/122; 502/123; 502/125; 502/127
[58] Field of Search ............... 502/111, 115, 116, 121, 502/122, 123, 125, 127

[56] References Cited

U.S. PATENT DOCUMENTS

| 3,953,414 | 4/1976 | Galli et al. ................. 526/348 |
| 4,111,835 | 9/1978 | Feschini et al. ............. 252/429 |
| 4,220,554 | 9/1980 | Scata et al. ................. 502/125 |
| 4,311,817 | 1/1982 | Morita et al. ............... 526/124 |
| 4,315,835 | 2/1982 | Scata et al. ................. 252/429 |
| 4,339,351 | 7/1982 | Mashita et al. .............. 502/125 X |
| 4,370,257 | 1/1983 | Imai et al. .................. 502/125 |
| 4,399,054 | 8/1983 | Ferraris et al. .............. 252/429 B |
| 4,401,589 | 9/1983 | Kioka et al. ................. 252/429 B |
| 4,426,314 | 1/1984 | Miyazaki et al. ............. 502/169 |
| 4,613,579 | 9/1986 | Furuhashi et al. ............ 502/125 X |
| 4,693,990 | 9/1987 | Hiroyuki et al. ............. 502/125 X |

FOREIGN PATENT DOCUMENTS 045977 2/1982 European Pat. Off. .
137694 2/1981 Japan .

*Primary Examiner*—Patrick P. Garvin
*Attorney, Agent, or Firm*—M. B. Kurtzman

[57] ABSTRACT

A method for the production of a catalyst component for use in the polymerization of an olefin, which method comprises causing a magnesium-containing solid obtained by contact of (A) magnesium metal, (B) a halogenated hydrocarbon represented by the general formula, RX, wherein R stands for an alkyl, aryl, or cycloalkyl group having 1 to 20 carbon atoms and X for a halogen atom, and (C) a compound of the general formula, $X_n{}^1M(OR^1)_{m-n}$, wherein $X^1$ stands for a hydrogen atom, a halogen atom, or a hydrocarbon group having 1 to 20 carbon atoms, M for a boron, carbon, silicon, aluminum, or phosphorus atom, $R^1$ for a hydrocarbon group having 1 to 20 carbon atoms, and m for the valency of said atom M, providing that $m > n \geq 0$ is satisfied, to contact (D) a halogen-containing alcohol and then contact (E) a titanium compound.

11 Claims, No Drawings

METHOD FOR PRODUCTION OF CATALYST COMPONENT FOR OLEFIN POLYMERIZATION (P-1292)

DETAILED DESCRIPTION OF THE INVENTION

1. Field of the Invention

This invention relates to a method for the production of a catalyst component and for its use in the polymerization of an olefin.

2. Description of the Prior Art

A magnesium-supported catalyst having a transition metal component such as titanium deposited on a magnesium compound-containing carrier and intended for use in the polymerization of an olefin has been known to the art. More often than not in the preparation of the catalyst, the carrier therefore is used after it has been mechanically pulverized. In such case, the produced catalyst for polymerization and consequently the polymer obtained therewith consists of particles which are non-uniform in shape.

Recently, a few attempts have been made to improve the shape uniformity of carrier particles. For example, a method which comprises converting an aqueous magnesium chloride solution or dissolved magnesium chloride hydrate ($MgCl_2.6H_2O$) through spray drying into spherical particles (U.S. Pat. No. 3,953,414 of Galli et al. issued Apr. 27, 1976, U.S. Pat. No. 4,111,835 of Feschini et al. issued Sept. 5, 1978, and U.S. Pat. No. 4,311,817 of Morita et al. issued Jan. 19, 1982), a method which comprises mutually contacting magnesium metal, a halogenated hydrocarbon, and an electron donor type compound such as an alcohol (Japanese patent application disclosure No. SHO 51(1976)-64,586), a method which comprises causing an organic magnesium compound to react with an ester of orthosilicic acid, and a method which comprises causing mutual reaction of an ester of orthosilicic acid and halogenated hydrocarbon (U.S. Pat. No. 4,220,554 of Scata et al. issued Sept. 2, 1980) have been proposed. Indeed these methods are capable of improving the shapes of particles of a carrier and a catalyst to some extent. The catalysts they produce, however, are not satisfactory in terms of activity.

The present inventors formerly found that a magnesium-containing solid consisting of particles uniform in shape and effectively serving as a carrier for an olefin polymerization catalyst is obtained by causing contact of magnesium metal, a halogenated hydrocarbon, and a compound of the general formula, $X_mC(OR)_{4-m}$ (U.S. Pat. No. 4,370,257 of Imai et al. issued Jan. 25, 1983). They have consequently developed a catalyst component having a titanium compound deposited on the aforementioned solid (U.S. Pat. No. 4,426,314 of Miyazaki et al. issued Jan. 17, 1984). This catalyst, however, has an unsolved problem concerning the activity for polymerization.

PROBLEM FOR SOLUTION BY THE INVENTION

An object of this invention is to provide a catalyst component for the polymerization of an olefin, excelling in the quality of particles and exhibiting efficiency in polymerization on a practical level.

INVENTION FOR SOLUTION OF THE PROBLEM

After a diligent study, the present inventors have found that the object of this invention can be accomplished by providing a catalyst component which is obtained by causing a magnesium-containing solid produced by contact of the magnesium-containing solid disclosed in U.S. Pat. No. 4,370,257 of Imai et al. issued Jan. 25, 1983 and U.S. Pat. No. 4,220,554 of Scata et al. issued Sept. 2, 1980 mentioned above with a halogen-containing alcohol prior to contact a titanium compound. The present invention has been perfected as the result.

SUMMARY OF THE INVENTION

To be specific, the essence of the present invention resides in the method for the production of a catalyst component for use in the polymerization of an olefin, which method comprises causing a magnesium-containing solid obtained by contact of (A) magnesium metal, (B) a halogenated hydrocarbon represented by the general formula, RX wherein R stands for an alkyl, aryl, or cycloalkyl group having 1 to 20 carbon atoms and X for a halogen atom, and (C) a compound of the general formula, $X_n^1M(OR^1)_{m-n}$ wherein $X^1$ stands for a hydrogen atom, a halogen atom, or a hydrocarbon group having 1 to 20 carbon atoms, M for a boron, carbon, silicon, aluminum, or phosphorus atom, $R^1$ for a hydrocarbon group having 1 to 20 carbon atoms, and m for the valency of said atom M, providing that $m > n \geq 0$ is satisfied, to contact (D) a halogen-containing alcohol and then contact (E) a titanium compound.

RAW MATERIALS FOR PREPARATION OF CARRIER (A) Magnesium metal

Though this invention does not discriminate magnesium metal on account of its form, magnesium metal is used particularly advantageously herein in the form of powder or chips. Preparatorily to actual use herein, the magnesium metal is desired to be washed with an inactive hydrocarbon such as, for example, an aliphatic, alicyclic, or aromatic hydrocarbon having 6 to 8 carbon atoms and then dried by heating in the presence of an inactive gas such as nitrogen.

(B) Halogenated hydrocarbon

Of the halogenated hydrocarbons represented by the general formula, RX, particularly desirable are chlorinated or brominated hydrocarbons containing as the substituent, R, and alkyl, aryl, or cycloalkyl group having 1 to 8 carbon atoms. Particularly desirable halogenated hydrocarbons include methyl, ethyl, isopropyl, n-butyl, n-octyl, and cyclohexyl chlorides, bromides, chlorobenzene, and o-chlorotoluene.

(C) Compound of general formula, $X_1^1M(OR^1)_{m-n}$

In the formula, the symbols M, $X^1$, $R^1$, m, and n have the same meanings as defined above. The substituent, $X^1$, may be a halogen-substituted hydrocarbon having 1 to 20 carbon atoms. Where $X^1$ is a hydrocarbon group, $X^1$ and $R^1$ may be same or different. Hereinafter, the compounds of the aforementioned general formula will be referred to simply as "alkoxy compounds".

As examples of the hydrocarbon group, there can be cited alkyl groups such as methyl, ethyl, propyl, i-propyl, butyl, amyl, hexyl, octyl, 2-ethylhexyl, and decyl, cycloalkyl groups such as cyclopentyl, cyclohexyl, and methylcyclohexyl, alkenyl groups such as allyl, propenyl, and butynyl, aryl groups such as phenyl, tolyl, and xylyl, and aralkyl groups such as phenethyl and 3-phenylpropyl. Among other hydrocarbon groups enumerated above, alkyl groups of 1 to 10 carbon atoms prove to be particularly advantageous. Illustrative examples of the alkoxy compounds are:

1. Compounds using a carbon atom as the substituent, M

The compounds of the formula, $C(OR^1)_4$, including $C(OCH_3)_4$, $C(OC_2H_5)_4$, $C(OC_3H_7)_4$, $C(OC_4H_9)_4$, $C(O-i-C_4H_9)_4$, $C(OC_6H_{13})_4$, and $C(OC_8H_{17})_4$; the compounds of the formula, $X^1C(OR^1)_3$, including $HC(OCH_3)_3$, $HC(OC_2H_5)_3$, $HC(OC_3H_7)_3$, $HC(OC_4H_9)_3$, $HC(O-i-C_4H_9)_3$, $HC(OC_6H_{13})_3$, $HC(OC_8H_{17})_3$, $HC(OC_6H_5)_3$; $CH_3C(OCH_3)_3$, $CH_3C(OC_2H_5)_3$, $C_2H_5C(OCH_3)_3$, $C_2H_5C(OC_2H_5)_3$, $C_6H_{11}C(OC_2H_5)_3$, $C_6H_5C(OCH_3)_3$, $C_6H_5C(OC_2H_5)_3$, $C_6H_5C(OC_3H_7)_3$, $C_7H_7C(OC_2H_5)_3$, $C_8H_9C(OC_2H_5)_3$; $CH_2BrC(OC_2H_5)_3$, $CH_2ClC(OC_2H_5)_3$, $CH_3CHBrC(OC_2H_5)_3$, $CH_3CHClC(OC_2H_5)_3$; $ClC(OCH_3)_3$, $ClC(OC_2H_5)_3$, $ClC(OC_3H_7)_3$, $ClC(O-i-C_4H_9)_3$, $ClC(OC_8H_{17})_3$, $ClC(OC_6H_5)_3$, and $BrC(OC_2H_5)_3$; and the compounds of the formula, $X_2^1C(OR^1)_2$, including $CH_3CH(OCH_3)_2$, $CH_3CH(OC_2H_5)_2$, $CH_2(OCH_3)_2$, $CH_2(OC_2H_5)_2$, $CH_2ClCH(OC_2H_5)_2$, $CHCl_2CH(OC_2H_5)_2$, $CCl_3CH(OC_2H_5)_2$, $CH_2BrCH(OC_2H_5)_2$, $CH_2ICH(OC_2H_5)_2$, and $C_6H_5CH(OC_2H_5)_2$.

2. Compounds using a silicon atom as the substituent, M

The compounds of the formula, $Si(OR^1)_4$, including $Si(OCH_3)_4$, $Si(OC_2H_5)_4$, $Si(OC_4H_9)_4$, $Si(Oi-C_4H_9)_4$, $Si(OC_6H_{13})_4$, $Si(OC_8H_{17})_4$, $Si[O.CH_2CH(C_2H_5)C_4H_9]_4$, and $Si(OC_6H_5)_4$; the compounds of the formula $RSi(OR^1)_3$, including $HSi(OC_2H_5)_3$, $HSi(OC_4H_9)_3$, $HSi(OC_6H_{13})_3$, $HSi(OC_6H_5)_3$, $CH_3Si(OCH_3)_3$, $CH_3Si(OC_2H_5)_3$, $CH_3Si(OC_4H_9)_3$, $C_2H_5Si(OC_2H_5)_3$, $C_4H_9Si(OC_2H_5)_3$, $C_6H_5Si(OC_2H_5)_3$, $C_2H_5Si(OC_6H_5)_3$, $ClSi(OCH_3)_3$, $ClSi(OC_2H_5)_3$, $ClSi(OC_3H_7)_3$, $ClSi(OC_6H_5)_3$, and $BrSi(OC_2H_5)_3$; the compounds of the formula, $R_2Si(OR^1)_2$, including $(CH_3)_2Si(OCH_3)_2$, $(CH_3)_2Si(OC_2H_5)_2$, $(CH_3)_2Si(OC_3H_7)_2$, $(C_2H_5)_2Si(OC_2H_5)_2$, $(C_6H_5)_2Si(OC_2H_5)_2$, $CH_3ClSi(OC_2H_5)_2$, $CHCl_2SiH(OC_2H_5)_2$, $CCl_3SiH(OC_2H_5)_2$, $CH_3BrSi(OC_2H_5)_2$, and $CH_3ISi(OC_2H_5)_2$; and the compounds of the formula $R_3SiOR^1$, including $(CH_3)_3SiOCH_3$, $(CH_3)_3SiOC_2H_5$, $(CH_3)_3SiOC_4H_9$, $(CH_3)_3SiOC_6H_5$, $(C_2H_5)_3SiOC_2H_5$, and $(C_6H_5)_3SiOC_2H_5$.

3. Compounds using a boron atom as the substituent, M

The compounds of the formula, $B(OR^1)_3$, including $B(OC_2H_5)_3$, $B(OC_4H_9)_3$, $B(OC_6H_{13})_3$, and $B(OC_6H_5)_3$.

4. Compounds using an aluminum atom as the substituent, M

The compounds of the formula, $Al(OR^1)_3$, including $Al(OCH_3)_3$, $Al(OC_2H_5)_3$, $Al(OC_3H_7)_3$, $Al(Oi-C_3H_7)_3$, $Al(OC_4H_9)_3$, $Al(Ot-C_4H_9)_3$, $Al(OC_6H_{13})_3$, and $Al(OC_6H_5)_3$.

5. Compounds using a phosphorus atom as the substituent, M

The compounds of the formula, $P(OR^1)_3$, including $P(OCH_3)_3$, $P(OC_2H_5)_3$, $P(OC_4H_9)_3$, $P(OC_6H_{13})_3$, and $P(OC_6H_5)_3$.

(D) Halogen-containing alcohol

The term "halogen-containing alcohol" as used in the present invention means a compound obtained from a monohydric or polyhydric alcohol possessing one or more hydroxyl groups in the molecular unit thereof by substituting a halogen atom for at least one freely selected hydrogen atom other than the hydrogen atom of the hydroyl group. As examples of the halogen atom, there can be cited chlorine, bromine, iodine, and fluorine atoms. Among other halogen atoms cited above, the chlorine atom proves to be particularly advantageous.

As examples of the compound of the foregoing definition, there can be cited 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propane diol, 2-chlorocyclohexanol, 4-chlorobenzhydrol, (m,o,p)-chlorobenzyl alcohol, 4-chlorocatechol, 4-chloro-(m,o)-cresol, 6-chloro-(m,o)-cresol, 4-chloro-3,5-dimethyl phenol, chlorohydroquinone, 2-benzyl-4-chlorophenol, 4-chloro-1-naphthol, (m,o,p)-chlorophenol, p-chloro-α-methylbenzyl alcohol, 2-chloro-4-phenyl phenol, 6-chlorothymol, 4-chlororesorcinol, 2-bromoethanol, 3-bromo-1-propanol, 1-bromo-2-propanol, 1-bromo-2-butanol, 2-bromo-p-cresol, 1-bromo-2-naphthol, 6-bromo-2-naphthol, (m,o,p)-bromophenol, 4-bromoresorcinol, (m,o,p)-fluorophenol, p-iodophenol; 2,2-dichloroethanol, 2,3-dichloro-1-propanol, 1,3-dichloro-2-propanol, 3-chloro-1-(α-chloromethyl)-1-propanol, 2,3,-dibromo-1-propanol, 1,3-dibromo-2-propanol, 2,4-dibromophenol, 2,4-dibromo-1-naphthol; 2,2,2-trichloroethanol, 1,1,1-trichloro-2-propanol, β,β,β-trichloro-tert-butanol, 2,3,4-trichlorophenol, 2,4,5-trichlorophenol, 2,4,6-trichlorophenol, 2,4,6-tribromophenol, 2,3,5-tribromo-2-hydroxy toluene, 2,3,5-tribromo-4-hydroxy toluene, 2,2,2-trifluoroethanol, α,α,α-trifluoro-m-cresol, 2,4,6-triiodophenol, 2,3,4,6-tetrachlorophenol, tetrachlorohydroquinone, tetrachloro-bis-phenol A, tetrabromo-bis-phenol A, 2,2,3,3-tetrafluoro-1-propanol, 2,3,5,6-tetrafluorophenol, and tetrafluororesorcinol.

(E) Titanium compound

The term "titanium compound" as used herein means a compound of divalent, trivalent, or tetravalent titanium. As concrete examples of the titanium compound, there can be cited titanium tetrachloride, titanium tetrabromide, trichloroethoxy titanium, trichlorobutoxy titanium, dichlorodiethoxy titanium, dichlorodibutoxy titanium, dichlorodiphenoxy titanium, chlorotriethoxy titanium, chlorotributoxy titanium, tetrabutoxy titanium, and titanium trichloride. Among other titanium compounds cited above, such tetravalent titanium halogenides as titanium tetrachloride, trichloroethoxy titanium dichlorodibutoxy titanium, and dichlorodiphenoxy titanium prove to be particularly desirable, titanium tetrachloride being the most desirable choice.

PROCEDURE FOR PREPARATION OF CATALYST COMPONENT

The catalyst component according to the present invention is obtained by placing magnesium metal, a halogenated hydrocarbon, and an alkoxy compound into mutual contact thereby producing a magnesium-containing solid, allowing a halogen-containing alcohol to come into contact with the magnesium-containing solid, and then allowing a titanium compound further to come into contact therewith.

(1) Contact among magnesium metal, halogenated hydrocarbon, and alkoxy compound

The method for establishing contact among the three components is not specifically limited. Virtually any method can be adopted for this contact. This contact can be accomplished, for example, by (1) a method which comprises simultaneously placing the three components into mutual contact, (2) a method which comprises preparatorily allowing magnesium metal to come into contact with the halogenated hydrocarbon and subsequently allowing the product of this contact or a compound obtained in advance by the contact of the two components, such as, for example, any of the compounds represented by the formulas, $ClMgCH_3$, $ClMgC_2H_5$, $ClMgC_3H_7$, $ClMgC_4H_9$, $ClMgi-C_4H_9$, $ClMgC_6H_{13}$, $ClMgC_8H_{17}$, $BrMgC_2H_5$, $BrMgC_4H_9$, $BrMgi-C_4H_9$, $IMgC_4H_9$, $ClMgC_6H_5$, and $BrMgC_6H_5$, which are known as Grignard reagents, to come into contact with the alkoxy compound (3) a method which comprises suspending magnesium metal in a solution of the alkoxy compound and adding a solution of the halogenated hydrocarbon to the resultant suspension, or (4) a method which comprises placing the alkoxy compound and the halogenated hydrocarbon into mutual contact and subsequently adding magnesium metal to the product of the contact, for example.

The ratio of the amounts of the alkoxy compound and magnesium metal to be used is desired to be such that the number of $OR^1$ groups in the alkoxy compound per magnesium atom in the magnesium metal exceeds 1 and preferably falls in the range of 3 to 5. In the case of an alkoxy compound represented by the formula, $X_2^1C(OR^1)_2$, for example, the amount of the alkoxy compound is desired to exceed 0.5 mol and preferably falls in the range of 1.5 to 2.5 mols, per gram atom of magnesium. In the case of an alkoxy compound represented by the formula, $X^1C(OR^1)_3$, the amount of the alkoxy compound is desired to exceed $\frac{1}{3}$ mol and preferably falls in the range of $\frac{1}{2}$ to 5/3 mols, per gram atom of magnesium. The amount of the halogenated hydrocarbon to be used is desired to fall in the range of 1 to 2 mols, per gram atom of magnesium.

The contact reaction of the foregoing description is accomplished by stirring the combined components under such conditions that the contact temperature falls in the range of 40° to 250° C., preferably 60° to 120° C., and the contact time falls in the range of 1 to 10 hours. This reaction may be carried out, when desired, in the presence of the same inactive hydrocarbon such as, for example, an aliphatic, alicyclic, or aromatic hydrocarbon having 6 to 8 carbon atoms, as used in the drying of magnesium metal.

It is permissible, for the purpose of promoting this reaction, to use iodine, an alkyl iodide, or an inorganic halide such as calcium chloride, copper chloride, manganese chloride, or a hydrogen halogenide.

The solid product prepared by the reaction described above may be cleaned with a suitable cleaning agent such as, for example, the aforementioned inactive hydrocarbon before it is subjected to contact with the halogen-containing alcohol.

(2) Contact with halogen-containing alcohol

Desirably, the contact of the magnesium-containing solid obtained as described in (1) above with the halogen-containing alcohol is accomplished by stirring the two components in the presence of an inactive medium. Examples of the inactive medium usable for this purpose include hydrocarbons such as pentane, hexane, heptane, octane, decane, cyclohexane, benzene, toluene, and xylene and halogenated hydrocarbons such a 1,2-dichloroethane, 1,2-dichloropropane, carbon tetrachloride, butyl chloride, isoamyl chloride, bromobenzene, and chlorotoluene.

The contact of the two components is generally carried out at a temperature in the range of $-20°$ C. to $+150°$ C. for a period in the range of 0.1 to 100 hours. When the contact entails evolution of heat, there can be adopted a method which comprises first bringing the two components into mutual contact gradually at a low temperature, elevating the temperature of the reaction system after the two components have been wholly added to each other, and subsequently continuing the contact.

The amount of the halogen-containing alcohol to be used is generally in the range of 0.05 to 20 gram mols, preferably 0.1 to 10 gram mols, per gram atom of magnesium in the solid.

(3) Contact with titanium compound

The solid substance obtained as described in (2) above may be washed with the inactive medium mentioned above preparatorily to the contact thereof with the titanium compound.

The contact of the solid substance with the titanium compound is generally effected by combining and stirring the two components in the presence or absence of the inactive medium mentioned above. Generally this contact is carried out at a temperature in the range of 0° to 200° C. for a period in the range of 0.5 to 20 hours. The amount of the titanium compound to be used for this contact is required to exceed 0.1 gram mol, preferably to fall in the range of 1 to 50 gram mols, per gram atom of magnesium in the solid substance mentioned above.

The contact of the solid substance with the titanium compound may be carried out two or more times as occasion demands. In this case, the contact can be performed in the same manner as described above. The product of the first contact, when necessary, may be washed with an inactive medium and then brought into contact with a fresh supply of the titanium compound (and the medium).

By the procedure described above, the catalyst component according to the present invention can be produced. This catalyst component, when necessary, may be washed with such a hydrocarbon as hexane, heptane, octane, cyclohexane, benzene, toluene, or xylene and may further be dried as occasion demands.

The catalyst component according to the present invention possesses a quality such that the specific surface area measured by the BET method as the absorption temperature of liquefied nitrogen falls in the range of 10 to 1,000 m²/g, the pore volume is in the range of 0.05 to 5 cm³/g, the particle size distribution is narrow, and the particles are uniform. The percentage composition of the catalyst component is such that the magnesium content is 1 to 25% by weight, the titanium content 0.5 to 10% by weight, and the chlorine content 4 to 80% by weight.

CATALYST FOR POLYMERIZATION OF OLEFIN

The catalyst component obtained by the present invention is combined with an organic compound of a metal from Groups I through III of the Periodic Table of Elements to produce a catalyst for use in the homopolymerization of an olefin or the copolymerization of one olefin with another olefin.

ORGANIC COMPOUND OF METAL FROM GROUPS I THROUGH III

As the organic metal compound, there can be used any of the organic compounds of lithium, magnesium, calcium, zinc, and aluminum. Among other organic metal compounds cited above, organic aluminum compounds prove to be particularly suitable. The organic aluminum compounds which are usable herein are those represented by the general formula, $R_nAlX_{3-n}$ (wherein R stands for an alkyl group or an aryl group, X for a halogen atom, and alkoxy group, or a hydrogen atom, and n for a number in the range of $1 \leq n \leq 3$). For example, alkyl aluminum compounds having 1 to 18 carbon atoms, preferably 2 to 6 carbon atoms, such as trialkyl aluminums, dialkyl aluminum monohalides, monoalkyl aluminum dihalides, alkyl aluminum sesquihalides, dialkyl aluminum monoalkoxides, and dialkyl aluminum monohydrides, mixtures of such alkyl aluminum compounds, and complexes thereof prove to be particularly desirable. As concrete examples of the alkyl aluminum compounds there can be cited trialkyl aluminums such as trimethyl aluminum, triethyl aluminum, tripropyl aluminum, triisobutyl aluminum, and trihexyl aluminum, dialkyl aluminum monohalide such as dimethyl aluminum chloride, diethyl aluminum chloride, diethyl aluminum bromine, diethyl aluminum iodide, and diisobutyl aluminum chloride, monoalkyl aluminum dihalides such as methyl aluminum dichloride, ethyl aluminum dichloride, methyl aluminum dibromide, ethyl aluminum dibromide, ethyl aluminum diiodide, and isobutyl aluminum dichloride, alkyl aluminum sesquihalides such as ethyl aluminum sesquichloride, dialkyl aluminum monoalkoxides such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide, and dialkyl aluminum hydrides such as dimethyl aluminum hydride, dipropyl aluminum hydride, and diisobutyl aluminum hydride. Among other organic aluminum compounds cited above, trialkyl aluminums, particularly triethyl aluminum and triisobutyl aluminum, prove to be particularly desirable. Such a trialkyl aluminum can be used in combination with some other readily commercially available aluminum organic compounds such as, for example, diethyl aluminum chloride, ethyl aluminum dichloride, ethyl aluminum sesquichloride, diethyl aluminum ethoxide, or diethyl aluminum hydride, or a mixture thereof, or a complex thereof.

An organic aluminum compound of the kind having two or more aluminum atoms coupled therein through the medium of an oxygen atom or a nitrogen atom can be also used. As examples of the compound of this description, there can be cited $(C_2H_5)_2AlOAl(C_2H_5)_2$ and $(C_4H_9)_2AlOAl(C_4H_9)_2$,

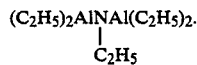

Organic compounds of metals other than aluminum metal include diethyl magnesium, ethyl magnesium chloride, zinc diethyl, $LiAl(C_2H_5)_4$, and $LiAl(C_7H_{15})_4$, for example.

Though the organic metal compound can be used by itself, it may be used in combination with the electron donor type compound.

As examples of the electron donor type compound, there can be cited carboxylates, carboxylic anhydrides, carboxylic acid esters, carboxylic acid halogenides, alcohols, ethers, ketones, amines, amides, nitriles, aldehydes, alcoholates, phophorus, arsenic, and antimony compounds coupled through the medium of carbon or oroxygen with organic groups, phosphamides, thioethers, thioesters, and carbonic esters.

An electron donor type compound which is formed of a hydroxycarbyloxy group-containing organic silicon compound is also usable. Examples of the hydroxycarbyloxy group-containing organic silicon compound include tetraalkyloxy silanes, tetraallyloxy silanes, tetraalkyl tetraaralkyloxy silanes, alkyltrialkyloxy silanes, alkyltriaryloxy silanes, aryltrialkyloxy silanes, aryltriaryloxy silanes, dialkyldialkyloxy silanes, dialkyldiaryloxy silanes, diaryldialkyloxy silanes, and diaryldiaryloxy silanes.

Two or more such electron donor type compounds may be used in a combined state. The electron donor type compound of this description may be used when the organic metal compound and the catalyst component are used in combination or it may be used after it has been brought into contact with the organic metal compound in advance.

The amount of the organic metal compound to be used in combination with the catalyst component according to the present invention is generally in the range of 1 to 2,000 gram mols, preferably 20 to 500 grams mols per gram atom of titanium in the catalyst component.

The ratio of the amounts of the organic metal compound and the electron donor type compound is so selected that the amount of the organic metal compound as aluminum falls in the range of 0.1 to 40 gram atoms, preferably 1 to 25 gram atoms, per mol of the electron donor type compound.

POLYMERIZATION OF OLEFIN

The catalyst which is composed of the catalyst component obtained as described above and the organic metal compound (and the electron donor type compound) is useful as a catalyst for the homopolymerization of a monolefin having 2 to 10 carbon atoms or for the copolymerization of the monoolefin with another monoolefin or diolefin having 3 to 10 carbon atoms. It exhibits a highly desirable performance as a catalyst particularly for the homopolymerization of an $\alpha$-olefin having 3 to 6 carbon atoms such as, for example, propylene, 1-butene, 4-methyl-1-pentene, or 1-hexane or the random or block copolymerization between two such $\alpha$-olefins as mentioned above or between such an $\alpha$-olefin and ethylene.

The polymerization reaction can be carried out effectively in a gaseous phase or a liquid phase. In the liquid phase, the polymerization can be carried out in an inactive hydrocarbon such as normal butane, isobutane, normal pentane, isopentane, hexane, heptane, octane cyclohexane, benzene, toluene, or xylene and a liquid monomer. The polymerization temperature is generally in the range of $-80°$ to $+150°$ C., preferably 40° to 120° C. The polymerization pressure is sufficient in the range of 1 to 60 atmospheres. The control of the molecular weight of the polymer to be obtained is effected by carrying out the polymerization in the presence of hydrogen or some other known molecular weight regulating agent. In the copolymerization, the amount of the comonomeric olefin given to be copolymerized with the main olefin is generally up to 30% by weight, preferably in the range of 0.3 to 15% by weight. The polymerization reaction by the use of the catalyst system of the present invention can be carried out continuously or batchwise under the conditions normally adopted for any polymerization. The copolymerization reaction may be carried out in a single stage or in two or more stages.

EFFECT OF THE INVENTION

The catalyst component to be obtained by the present invention functions effectively as a catalyst component in the production of polyolefin, particularly a homopolymer of ethylene, or a copolymer of ethylene with another olefin.

A polymerization catalyst using the catalyst component according to the present invention exhibits a high activity for polymerization and, moreover, the polymer powder obtained therewith consists of particles uniform in shape and size.

EXAMPLES

Now, the present invention will be described more specifically below with reference to the following examples and applied examples. Wherever the term "percent (%)" is used in these examples, it shall be construed as meaning a percent by weight unless otherwise specified.

The PSDI of the catalyst component was determined by measuring the particle size distribution of a sample with a particle sizer, a product of Malvern Corp. marketed under trademark designation of "MALVERN 3600", and carrying out a calculation of the following formula using the result of the measurement.

$$PSDI = \log \frac{\text{Particle diameter of particles accounting for 90\% of cumulative weight}}{\text{Particle diameter of particles accounting for 10\% of cumulative weight}}$$

The melt index (MI) of the polymer was determined by the method defined in ASTM D1238. The bulk density thereof was determined by the method defined in ASTM D1895-69.

The particle size distribution of the polymer was measured with the standard sieves specified by W. S. Tyler Corp. The PSDI value consequently found was reported as the index of the particle size distribution.

EXAMPLE 1

Preparation of magnesium-containing solid

In a reaction vessel provided with a reflux condenser and having an inner volume of 1 liter, 12.8 g of magnesium metal chips (purity 99.5% and average particle diameter 1.6 mm) and 250 ml of n-hexane were placed under an atmosphere of nitrogen gas and stirred at 68° C. for one hour. Then, the magnesium metal was taken out of the resultant mixture and dried at 65° C. under a vacuum to obtain preactivated magnesium metal.

Subsequently, a suspension obtained by adding to the magnesium metal 88 ml (0.53 mol) of ethyl ortho-formate [HC(OC$_2$H$_5$)$_3$] and 0.5 ml of a methyl iodide solution of 10% of iodine was held at 55° C. The suspension and a 5-ml portion of a solution of 80 ml (0.8 mol) of n-butyl chloride in 100 ml of n-hexane added dropwise thereto were stirred for 50 minutes. Then, the remainder of the aforementioned solution was added dropwise thereto over a period of 80 minutes. The resultant combined liquid was stirred at 70° C. for four hours to undergo a reaction. Consequently, there was obtained a solid reaction product.

This reaction product was washed six times each with 300 ml of n-hexane at 50° C. and dried under a vacuum at 60° C. for one hour, to recover 55.6 g of white powdery magnesium-containing solid. This solid was found to contain 22.5% of magnesium and 34.0% of chlorine.

Contact with 2,2,2-trichloroethanol

In a reaction vessel provided with a reflux condenser, a stirrer, and a dropping funnel and having an inner volume of 300 ml, 6.3 g of the magnesium-containing solid and 50 ml of n-heptane were placed under an atmosphere of nitrogen gas to form a suspension. This suspension was kept stirred at room temperature and a mixed solution of 2.0 ml (0.02 m.mol) of 2,2,2-trichloroethanol and 11 ml of n-heptane was added to the suspension through the dropping funnel over a period of 30 minutes. The resultant combined liquid was stirred at 80° C. for one hour. The solid consequently formed in the stirred liquid was separated by filtration and washed six times each with 100 ml of n-hexane kept at room temperature, to obtain a solid component.

Contact with titanium tetrachloride

In a reaction vessel provided with a reflux condenser and a stirrer and having an inner volume of 300 ml, 6.3 g of the solid component obtained as described above and 40 ml of toluene were placed to form a suspension and the suspension and 60 ml of titanium tetrachloride added thereto were stirred at 120° C. for two hours under an atmosphere of nitrogen gas. The solid substance consequently formed therein was separated by filtration at 110° C. and washed seven times each with 100 ml of n-hexane, to obtain 5.7 g of a catalyst component.

This catalyst component was found to have a specific surface area of 295 m$^2$/g and contain 3.8% of titanium, 24.5% of magnesium, and 67.3% of chlorine. The average particle diameter of this catalyst component was 23 μm and the PSDI value thereof was 0.31.

EXAMPLE 2

Preparation of magnesium-containing solid

By following the procedure of Example 1, 8.3 g of magnesium metal was activated. Then, a suspension obtained by adding to the magnesium metal 140 ml of n-butyl ether an 0.5 ml of methyl iodide solution of 10% of iodine was kept at 55° C. To the suspension, a solution of 38.5 ml of n-butyl chloride in 50 ml of n-butyl ether was added dropwise over a period of 50 minutes. The resultant combined liquid was stirred at 70° C. for four hours to undergo a reaction. The reaction solution was kept at 55° C.

Then, 55.7 ml of HC(OC$_2$H$_5$)$_3$ was added dropwise to the reaction solution over a period of one hour. At this time, a solid was observed to form therein. After the dropwise addition was completed, the reaction mixture was left reacting at 60° C. for 15 minutes. The solid resulting from the reaction was washed six times each with 300 ml of n-hexane and dried under a vacuum at room temperature for one hour, to recover 31.6 g of a magnesium-containing solid having a magnesium content of 19.0% and a chlorine content of 28.9%.

Contact with 2,2,2-trichloroethanol

A solid component was obtained by following the procedure of Example 1, except 6.3 g of the magnesium-containing solid obtained as described above was used instead.

Contact with titanium tetrachloride

The procedure of Example 1 was followed in establishing contact between the solid component obtained as described above and titanium tetrachloride. As the result, there was obtained a catalyst component having a specific surface area of 288 m$^2$/g, a titanium content of 3.7%, a magnesium content of 24.6%, a chlorine content of 67.5%, an average particle diameter of 20 μm, and a PSDI value of 0.32.

EXAMPLES 3–8

Catalyst components possessing the compositions and physical properties indicated below were obtained by following the procedure of Example 1, except the varying alkoxy compounds indicated below were used in the place of HC(OC$_2$H$_5$)$_3$.

| Example | Alkoxy compound | Titanium content (%) | Average particle diameter (μm) | PSDI |
|---|---|---|---|---|
| 3 | CH$_3$CH(OC$_2$H$_5$)$_2$ | 4.0 | 28 | 0.39 |
| 4 | C(OC$_2$H$_5$)$_4$ | 2.9 | 17 | 0.47 |
| 5 | Si(OC$_2$H$_5$)$_4$ | 3.5 | 6 | 0.33 |
| 6 | Al(OC$_2$H$_5$)$_3$ | 3.4 | 14 | 0.39 |
| 7 | B(OC$_2$H$_5$)$_3$ | 5.1 | 13 | 0.41 |
| 8 | P(OC$_2$H$_5$)$_3$ | 4.3 | 19 | 0.36 |

EXAMPLES 9 THROUGH 12

Catalyst components possessing the compositions and physical properties indicated below were obtained by following the procedure of Example 1, except the halogen-containing alcohols indicated below were used in the place of 2,2,2-trichloroethanol.

| Example | Halogen-containing alcohol | Titanium content (%) | Average particle diameter (μm) | PSDI |
|---|---|---|---|---|
| 9 | 1,1,1-Trichloro-2-propanol | 3.6 | 29 | 0.40 |
| 10 | 2,2-Dichloroethanol | 3.8 | 20 | 0.47 |
| 11 | p-Chlorophenol | 3.1 | 24 | 0.41 |
| 12 | 1-Bromo-2-butanol | 2.5 | 27 | 0.52 |

EXAMPLES 13 THROUGH 15

Catalyst components possessing the compositions and physical properties indicted below were obtained by following the procedure of Example 1, except the amount of 2,2,2-trichloroethanol (TCE) was varied as indicated below.

| Example | Amount of TCE used | Titanium content (%) | Average particle diameter (μm) | PSDI |
|---|---|---|---|---|
| 13 | 1 | 1.7 | 23 | 0.38 |
| 14 | 4 | 2.8 | 29 | 0.47 |
| 15 | 6 | 3.3 | 30 | 0.55 |

COMPARATIVE EXPERIMENT 1

A catalyst component was obtained by following the procedure of Example 1, except the contact with 2,2,2-trichloroethanol was omitted. This catalyst component had a titanium content of 1.3%, an average particle diameter of 16 μm, and a PSDI value of 0.38.

COMPARATIVE EXPERIMENT 2

A catalyst component was obtained by following the procedure of Example 5, except the contact with 2,2,2-trichloroethanol was omitted. This catalyst component had a titanium content of 3.3%, an average particle diameter of 6 μm, and a PSDI value of 0.32.

APPLIED EXAMPLE 1

Polymerization of ethylene

In an autoclave of stainless steel (SUS 32) provided with a stirrer and having an inner volume of 1.5 liters, 10.2 mg of the catalyst component obtained in Example 1, 0.7 m.mol of triisobutyl aluminum, and 390 g of isobutane were placed under an atmosphere of nitrogen gas and the resultant system for polymerization was heated to 85° C. Then, hydrogen was introduced therein until the partial pressure of hydrogen reached 20 kg/cm$^2$ and ethylene was introduced until the partial pressure of ethylene reached 5.0 kg/cm$^2$. Ethylene was continuously fed to the system, there to be polymerized, for one hour at such a rate as to maintain the total pressure of the polymerization system constant. After the polymerization was completed, the polymerization system was purged of the solvent and the unaltered ethylene. The white powdery polymer consequently obtained was removed from the autoclave and dried under a vacuum at 70° C. for 10 hours, to produce 245 g of powdery polyethylene having an MI value of 3.3 g/10 minutes and a bulk density of 0.38 g/cm$^3$ [Kc (amount of produced polymer in gram per gram of catalyst component)=24,000]. The PSDI value of the produced polymer was 0.33 and the average particle diameter was 750 μm.

APPLIED EXAMPLES 2 THROUGH 17

Polymerization of ethylene was carried out by following the procedure of Applied Example 1, except the catalyst components obtained in Examples 2 through 15, Comparative Experiment 1, and Comparative Experiment 2 were used in the place of the catalyst component obtained in Example 1. The results were as shown below.

| Applied Example | Catalyst component | Kc (g/g-cat.) | MI (g/10 min.) | Bulk density | PSDI |
|---|---|---|---|---|---|
| 2 | Example 2 | 26600 | 4.3 | 0.39 | 0.30 |
| 3 | Example 3 | 22800 | 2.8 | 0.37 | 0.33 |
| 4 | Example 4 | 17300 | 3.3 | 0.37 | 0.40 |
| 5 | Example 5 | 11900 | 3.8 | 0.39 | 0.29 |
| 6 | Example 6 | 14700 | 3.5 | 0.40 | 0.38 |
| 7 | Example 7 | 17500 | 4.1 | 0.37 | 0.33 |
| 8 | Example 8 | 16000 | 2.9 | 0.38 | 0.31 |
| 9 | Example 9 | 19000 | 3.1 | 0.35 | 0.35 |
| 10 | Example 10 | 20200 | 3.3 | 0.38 | 0.45 |
| 11 | Example 11 | 18400 | 3.7 | 0.38 | 0.41 |
| 12 | Example 12 | 22500 | 2.9 | 0.38 | 0.49 |
| 13 | Example 13 | 18700 | 3.3 | 0.39 | 0.35 |
| 14 | Example 14 | 26200 | 3.5 | 0.40 | 0.33 |
| 15 | Example 15 | 25300 | 3.8 | 0.40 | 0.33 |
| 16 | Comparative Experiment 1 | 19900 | 2.1 | 0.20 | 0.69 |
| 17 | Comparative | 11600 | 2.1 | 0.39 | 0.31 |

| Applied Example | Catalyst component | Kc (g/g-cat.) | MI (g/10 min.) | Bulk density | PSDI |
|---|---|---|---|---|---|
| | Experiment 2 | | | | |

APPLIED EXAMPLE 18

Copolymerization of ethylene with 1-butene

In the same autoclave as used in Applied Example 1, 11.5 mg of the catalyst component obtained in Example 1, 0.7 m.mol of triisobutyl aluminum, and 700 ml of isobutane were placed under an atmosphere of nitrogen gas and the resultant system for polymerization was heated to 85° C. Then, hydrogen was introduced therein until the partial pressure of hydrogen reached 0.08 kg/cm$^2$, ethylene was introduced therein until the partial pressure of ethylene reached 3 kg/cm$^2$, and 5 g of 1-butene was added thereto. Ethylene was continuously fed to the system, there to be polymerized, for one hour at such a ratio as to maintain the total pressure of the polymerization system constant. After the polymerization was completed, the contents of the autoclave were subjected to the same treatment as in applied Example 1, to produce 176 g of powdery ethylene-1-butene copolymer (Kc=15,600). The produced copolymer was found to possess a bulk density of 0.36 g/cm$^3$, a true density of 0.926 g/cm$^3$, an MI value of 0.003 g/10 minutes, and a PSDI value of 0.32.

What is claimed is:

1. A supported titanium-containing catalyst component obtained by contacting
   I. a magnesium-containing solid obtained by contact of (A) magnesium metal, (B) a halogenated hydrocarbon represented by the general formula RX, wherein R stands for an alkyl, aryl or cycloalkyl group having 1 to 20 carbon atoms and X for a halogen atom, and (C) an alkoxy compound of the general formula $X_n^1 M(OR^1)_{m-n}$, wherein $X^1$ stands for a hydrogen atom, a halogen atom, or a hydrocarbon group having 1 to 20 carbon atoms, M stands for a boron, carbon, silicon, aluminum, or phosphorus atom, $R^1$ represents a hydrocarbon group having 1 to 20 carbon atoms, m represents the valency of said atom M, and m>n≧0, with
   II. a halogen-containing alcohol, and
   III. contacting the solid product obtained with a titanium compound.

2. The catalyst component in accordance with claim 1 wherein the Mg metal and the halogenated hydrocarbon are contacted so as to provide a Grignard reagent.

3. The catalyst component in accordance with claim 1 wherein R is an alkyl group having from 1 to 8 carbon atoms, cyclohexyl or an aryl group having 6 to 7 carbon atoms and X is chlorine, the alkoxy compound (C) is selected from the group consisting of HC(OC$_2$H$_5$)$_3$, CH$_3$CH(OC$_2$H$_5$)$_2$, C(OC$_2$H$_5$)$_4$, Si(OC$_2$H$_5$)$_4$, Al(OC$_2$H$_5$)$_3$, B(OC$_2$H$_5$)$_3$ and P(OC$_2$H$_5$)$_3$, the halogenated alcohol is selected from 2,2,2-trichloroethanol, 1,1,1-trichloro 2-propanol, 2,2-dichloroethanol, p-chlorophenol and 1-bromo-2-butanol, and the titanium compound is selected from titanium tetrachloride, trichloroethoxy titanium, dichlorodibutoxy titanium, and dichlorodiphenoxy titanium.

4. The catalyst component in accordance with claim 3 wherein the halogenated hydrocarbon is n-butyl chloride, the compound represented by the formula $X_n^1 M(OR^1)_{m-n}$ is one of orthoformate or ethyl orthoformate, and the titanium compound is titanium tetrachloride.

5. The catalyst component in accordance with claim 1 wherein the alkoxy compound (C) is in contact with the magnesium compound in the amount such that the number of OR$^1$ groups in the alkoxy compound per magnesium atom exceeds 1.

6. The catalyst component in accordance with claim 5 wherein the ratio of alkoxy groups to the magnesium is in the range of 3 to 5.

7. The catalyst component in accordance with claim 1 wherein the amount of halogenated alcohol contacted with the magnesium-containing solid is in the range of 0.05 to 20 per gram atom of magnesium in the solid.

8. The catalyst component in accordance with claim 1 and the titanium compound is contacted in the range of 0.1 gram mol to 100 gram mols per gram atom of magnesium in the solid product.

9. A method for the production of a supported titanium-containing catalyst component, which method comprises contacting
   I. a magnesium-containing solid obtained by contact of (A) magnesium metal, (B) a halogenated hydrocarbon represented by the general formula RX, wherein R represents an alkyl, aryl or cycloalkyl group having 1 to 20 carbon atoms and X for a halogen atom, and (C) a compound of the general formula $X_n^1 M(OR^1)_{m-n}$, wherein $X^1$ represents a hydrogen atom, a halogen atom, or a hydrocarbon group having 1 to 20 carbon atoms, M represents a boron, carbon, silicon, aluminum, or phosphorus atom, $R^1$ represents a hydrocarbon group having 1 to 20 carbon atoms, m represents the valency of said atom M, and m>n≧0, with
   II. a halogen-containing alcohol, and
   III. contacting the solid product obtained with a titanium compound.

10. A catalyst system for the polymerization of olefins comprising
   i. the supported titanium-containing catalyst component of claim 1
   ii. an organo aluminum cocatalyst and
   iii. an electron donor which can be the same as the electron donor employed in the supported titanium-containing catalyst component or an electron donor compound selected from organic silicon compounds and electron donor compounds containing a nitrogen, sulfur, oxygen or phosphorus hetero atom.

11. The catalyst system in accordance with claim 10 wherein the organo aluminum component is aluminum triethyl and the electron donor compound is selected from phenyl triethoxy silane, ethyl benzoate, 2,2,5,5-tetramethyl piperidine, and mixtures thereof.

* * * * *